(12) United States Patent
DeLuca et al.

(10) Patent No.: US 9,348,928 B2
(45) Date of Patent: May 24, 2016

(54) GENERATING AN ELECTRONIC FORM LOCALLY ON A CLIENT COMPUTER FROM INPUT PARAMETERS

(75) Inventors: Lisa Seacat DeLuca, San Francisco, CA (US); Soobaek Jang, Hamden, CT (US); Troy M. Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 13/313,470

(22) Filed: Dec. 7, 2011

(65) Prior Publication Data

US 2013/0151935 A1    Jun. 13, 2013

(51) Int. Cl.
*G06F 17/00* (2006.01)
*G06F 17/30* (2006.01)
*G06F 17/24* (2006.01)

(52) U.S. Cl.
CPC ........ *G06F 17/30887* (2013.01); *G06F 17/243* (2013.01)

(58) Field of Classification Search
CPC ................................................ G06F 17/30887
USPC .................. 715/200, 205, 208, 255, 271, 272
See application file for complete search history.

(56) References Cited

U.S. PATENT DOCUMENTS

| | | | |
|---|---|---|---|
| 5,684,951 A * | 11/1997 | Goldman et al. | 726/6 |
| 7,203,699 B2 | 4/2007 | Bellamy | |
| 7,519,694 B1 * | 4/2009 | Arcot | 709/220 |
| 7,685,230 B2 | 3/2010 | Lakshminarasimhan Kanchi | |
| 7,895,598 B2 | 2/2011 | Eide et al. | |
| 8,060,414 B1 * | 11/2011 | Lin et al. | 705/26.5 |
| 2002/0000468 A1 * | 1/2002 | Bansal | 235/462.15 |
| 2007/0011742 A1 * | 1/2007 | Nakayama et al. | 726/22 |
| 2007/0186150 A1 | 8/2007 | Rao et al. | |
| 2009/0193076 A1 | 7/2009 | Klubertanz | |
| 2014/0289870 A1 * | 9/2014 | Selander et al. | 726/28 |

* cited by examiner

*Primary Examiner* — Stephen Hong
*Assistant Examiner* — Gregory J Vaughn
(74) *Attorney, Agent, or Firm* — Daniel R. Simek

(57) ABSTRACT

A computer displays a screen that includes a uniform resource locator (URL). In response to a selection of a uniform resource locator (URL) by an end-user at a computer, the computer intercepts a request within the computer to prevent the request from being sent to another computer. The computer determines whether the URL includes one or more parameters that define a field with a missing value, and that need entry of one or more input values from the end-user. The computer generates an electronic form utilizing the one or more parameters to formulate a field, within the electronic form, for each of the one or more parameters. The computer displays the electronic form including the field for each of the one or more parameters, which enables the end-user to enter information into the field within the electronic form.

8 Claims, 4 Drawing Sheets

US 9,348,928 B2

GENERATING AN ELECTRONIC FORM LOCALLY ON A CLIENT COMPUTER FROM INPUT PARAMETERS

BACKGROUND

1. Field of the Invention

The present invention relates generally to generating an electronic form, and more specifically to generating an electronic form locally on a client computer from input parameters.

2. Description of the Related Art

An electronic form is utilized to obtain information from an end-user at a client computer via a keyboard, a touchscreen, or voice. The electronic form can elicit a variety of information such as username and password login information, address information, payment information, registration information, product information, customer feedback for a product survey, job applicant information for an employment application, or even prospective student information to complete an application for admission to a university.

It is known for a client computer having a web browser and display to send a request to a server computer to obtain an electronic form for display at the client computer, and for entry of information by the end-user. To send the request, an end-user can select an object or URL on a web page, scan a barcode having a uniform resource locator (URL), or enter a URL that contains an address of the electronic form into the web browser. Selection, scanning, or entry of a URL initiates a request that is transmitted from the client computer, through a network, and then to a server computer that stores the electronic form. Subsequently, the server computer, in response to the request, generates electronic form information and transmits that information through the network to the client computer. The electronic form information may be defined in an HTML document. The web browser of the client computer then parses the electronic form information in order to display the electronic form to the end-user. Thus, the known approach requires that the client computer have network connectivity in order to send the request to the server computer and receive the information needed to display the electronic form to the end-user. Moreover, requiring the client computer to send the request to the server computer and receive the information needed to display the electronic form from the server computer, causes delays in obtaining the electronic form for display on the client computer.

Furthermore, it is also known to cache at the client computer web pages and other documents received from a server computer, for subsequent use at the client computer. However, the challenge of reducing the amount of time required to display an electronic form on a client computer continues to persist.

SUMMARY

Aspects of an embodiment of the present invention disclose a method, computer system, and program product for generating an electronic form. In response to a selection of a uniform resource locator (URL) by an end-user at a computer, the computer intercepts a request within the computer to prevent the request from being sent to another computer. The computer determines whether the URL includes one or more parameters that define a field with a missing value, and that need entry of one or more input values from the end-user. The computer generates an electronic form utilizing the one or more parameters to formulate a field, within the electronic form, for each of the one or more parameters. The computer displays the electronic form including the field for each of the one or more parameters, which enables the end-user to enter information into the field within the electronic form.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide an electronic form generation program, installed on a client computer, for generating an electronic form at the client computer and thereby avoiding having to retrieve the electronic form from a server computer. The electronic form generation program provides functionality for intercepting a request initiated by selection of a uniform resource locator (URL) containing one or more parameters that define a field with a missing value. The URL may be a selectable (i.e., clickable and/or capable of being scanned) link or object. In addition, the URL may be within a two-dimensional barcode (e.g., quick response code). The parameters that define a field with a missing value are utilized to generate fields within the electronic form. The fields invite entry of input values from the end-user. For example, if the URL is "http://www.ibm.com/form?name=XYZ&address=&phone=" then the parameters with a missing value are "address" and "phone", because they are followed by an equal sign (or other symbol suggestive of the need for a data value) with no data values after the equal sign. Thus, parameters "address" and "phone" would be utilized to generate and label fields within the electronic form, and there would be a blank space in each of the fields for the end-user to enter a suitable data value. However, a field would not be generated for parameter "name", because parameter "name" has an assigned input value of "XYZ" after the equal sign. Alternatively, a field could be generated for parameter "name" with a pre-filled value. Moreover, the electronic form generation program intercepting the request prevents the request from being sent to another computer. After intercepting the request, the electronic form generation program handles the request and generates the electronic form within the client computer by utilizing the parameters that define a field with a missing value. As a result, sending the request to a server computer via a network to obtain the electronic form is unnecessary, and resultant delays in generating the electronic form can be avoided.

Figure 1:
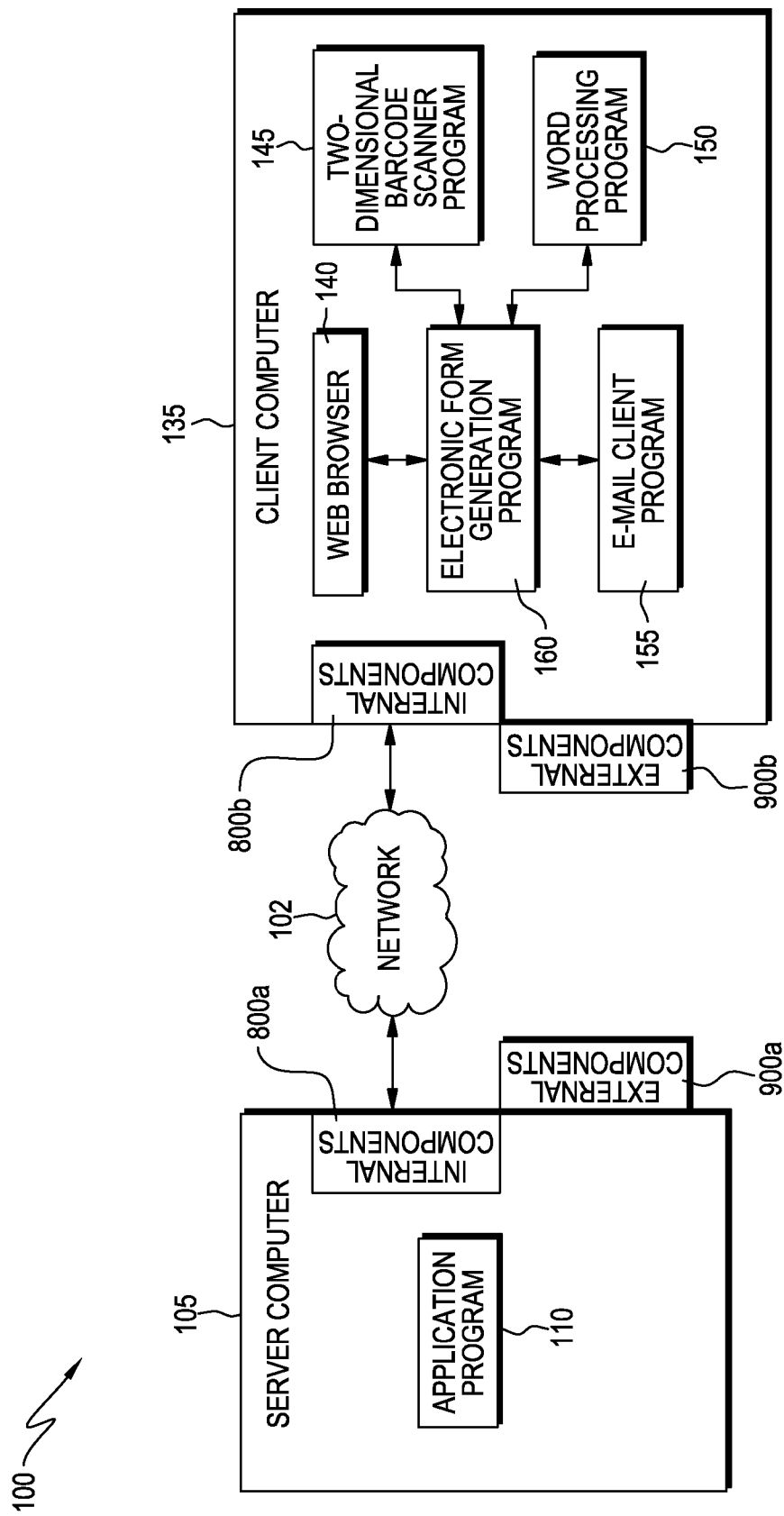
FIG. 1 is a block diagram of a distributed computer system, including a server computer having an application program installed that utilizes electronic forms, and a client computer having an electronic form generation program installed according to an embodiment of the present invention.

FIG. 1 illustrates computer system 100 that includes network 102, server computer 105 having application program 110 installed, and client computer 135 having an electronic form generation program 160 and web browser 140 installed. Server computer 105 and client computer 135 each include respective internal components 800a and 800b, and respective external components 900a and 900b, as described below in more detail with respect to FIG. 4. In addition, electronic form generation program 160 interacts with web browser 140, two-dimensional barcode scanner program 145, word processing program 150, e-mail client program 155, or a combination thereof to intercept a request that results from an end-user's selection of a URL. Specifically, web browser 140, programs 145, 150, and 155 can be utilized to supply the URL. In embodiments of the invention, electronic form generation program 160 interacts with web browser 140, two-dimensional barcode scanner program 145, word processing program 150, and e-mail client program 155 to intercept a request resulting from the end-user's selection of the URL that is directed to requesting an electronic form. Web browser 140 includes any known software program (e.g., Windows® Internet Explorer® web browser available from Microsoft Corporation of Redmond, Wash., USA, or Firefox® web browser available from the Mozilla Foundation of Mountain View, Calif., USA) that sends HTTP requests through network 102 for web page documents (e.g., HTML documents), and interprets and renders the web page documents for display to the end-user. Two-dimensional barcode scanner program 145 includes any software program that can scan a two-dimensional barcode (e.g., quick response code) that contains a URL, identify the URL, and allow for selection of the URL within the two-dimensional barcode. Word processing program 150 includes any software program that can be used for text editing to enter and display a URL. Moreover, e-mail client program 155 includes any software program that can be utilized to send, receive, and display an e-mail message that contains a URL. Thus, electronic form generation program 160 can monitor an end-user's selection of a URL within web browser 140, two-dimensional barcode scanner program 145, word processing program 150, and e-mail client program 155.

In response to the end-user's selection of the URL, electronic form generation program 160 can generate the electronic form on client computer 135 without having to retrieve from another computer, for example server computer 105, information needed to display the electronic form. Selection of the URL by the end-user includes clicking, scanning, or even entry of the URL within web browser 140, two-dimensional barcode scanner program 145, word processing program 150, and e-mail client program 155. Specifically, the selection of the URL includes the end-user clicking, scanning, or entering the URL that may be provided in a web page via web browser 140, a two-dimensional barcode via two-dimensional barcode scanner program 145, a text file via word processing program 150, or an e-mail via e-mail client program 155.

As part of system 100, network 102 connects server computer 105 to client computer 135 and allows for the sharing of resources. The resources include computer hardware and at least one software application program, such as application program 110, which utilizes an electronic form for obtaining information from the end-user. Thus, in a preferred embodiment of the present invention, application program 110 is a software program that utilizes an electronic form to obtain and then process a variety of information such as username and password login information, address information, payment information, registration information, product information, customer feedback information, job applicant information, even prospective student applicant information, or a suitable combination thereof. Network 102 may be an intranet, a local area network (LAN), and/or a wide area network (WAN). Therefore, network 102 may include wired connections and/or wireless connections, and can handle a variety of network protocols to support communication between server computer 105 and client computer 135. In preferred embodiments of the present invention, client computer 135 may be a laptop computer, tablet personal computer, desktop computer, personal digital assistant (PDA), or smart phone that combines functionality of a PDA and a mobile phone. Therefore, client computer 135 can be any programmable electronic device as described below in more detail with respect to FIG. 4.

As described above, electronic form generation program 160 operates to monitor the end-user's selection of a URL, and intercept a request initiated by the selection of the URL. Otherwise, without such interception of the URL, the request would be sent to server computer 105 for retrieving information needed to display an electronic form. Thus, in a preferred embodiment, electronic form generation program 160 intercepts the request to prevent the request from being sent to another computer such as server computer 105. Subsequent to intercepting the request, electronic form generation program 160 can then determine whether the URL contains parameters that define a field with a missing value, and that need entry of an input value from the end-user. If the URL contains such parameters, then electronic form generation program 160 generates the electronic form on client computer 135. Specifically, electronic form generation program 160 generates the electronic form that includes one or more fields, each having a name specified by the parameters, for display to the end-user. The end-user can enter an input value into the one or more fields within the electronic form. After the end-user enters an input value into each of the one or more fields that need an input value, then the end-user can submit the electronic form to server computer 105 by selecting a submit button or link within the electronic form. Alternatively, the end-user can cancel the electronic form by selecting a cancel button or link, within the electronic form. Selecting the cancel button or link avoids submitting the electronic form to server computer 105.

Figure 2:
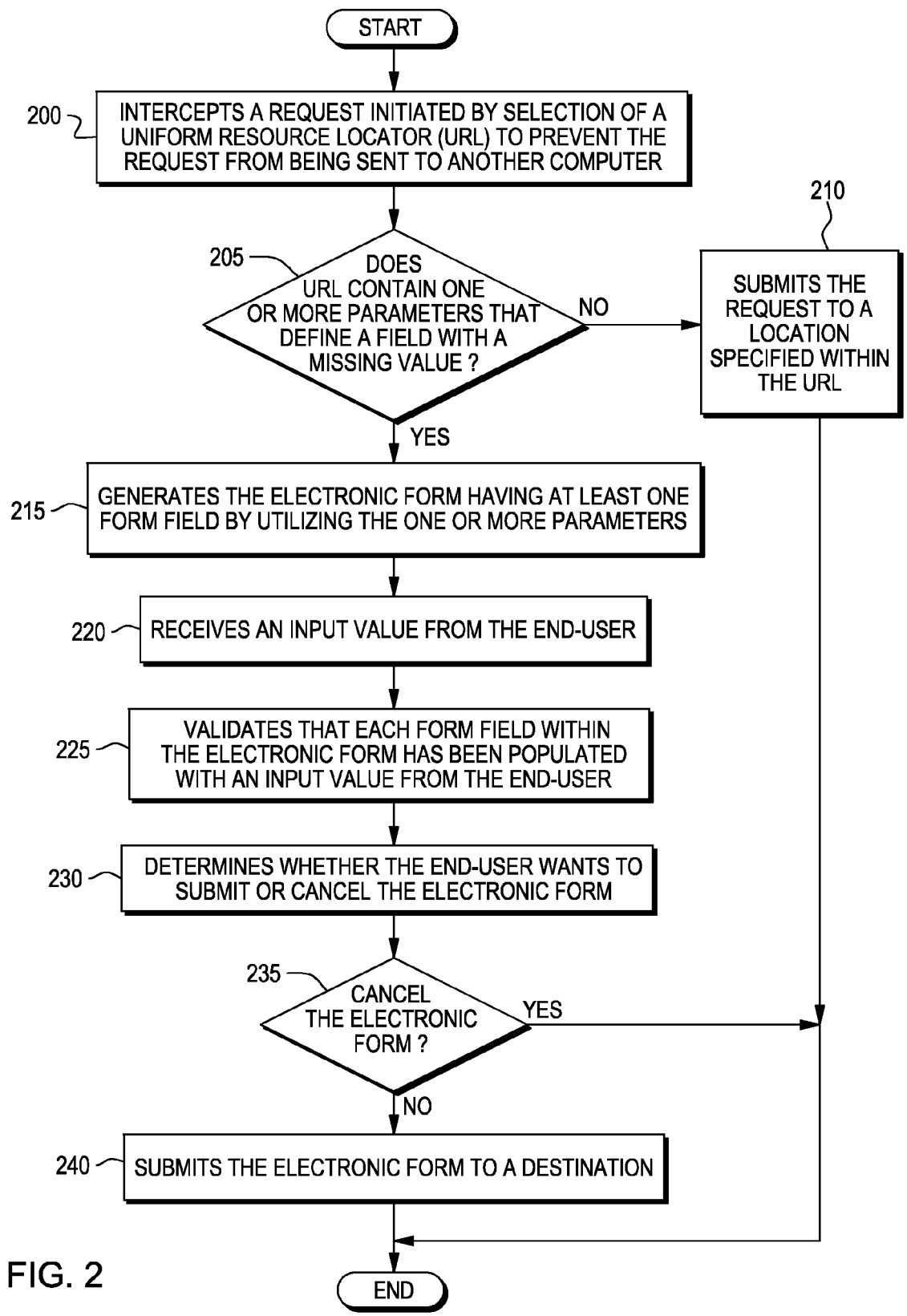
FIG. 2 is a flowchart illustrating operations of the electronic form generation program that generates an electronic form on the client computer of FIG. 1 according to an embodiment of the present invention.

FIG. 2 is a flowchart illustrating the steps of electronic form generation program 160 in more detail. To begin the process, client computer 135 displays a screen that includes a URL. The URL is subsequently utilized for generating the electronic form. Specifically, the end-user can select the URL via web browser 140, two-dimensional barcode scanner program 145, word processing program 150, and/or e-mail client program 155 as explained above. Electronic form generation program 160 monitors the end-user's input, which includes the end-user's selection of the URL within web browser 140, two-dimensional barcode scanner program 145, word processing program 150, and/or e-mail client program 155. The end-user selects the URL. In response to the selection of the URL by the end-user, client computer 135 initiates a request to obtain an electronic form for display to the end-user.

After the request is initiated, electronic form generation program 160 intercepts the request to prevent the request from being sent to another computer such as server computer 105 (step 200). Electronic form generation program 160 monitors and intercepts all requests that are initiated by selection of the URL. Subsequently, electronic form generation program 160 retrieves the URL from the request, parses the URL to obtain information about the electronic form that is needed for display to the end-user. The parsing of the URL allows electronic form generation program 160 to identify whether the URL contains one or more parameters that define fields with a missing value and that need entry of an input value from the end-user. Moreover, the information obtained about the electronic form may include validation information, for example, information about input type for a field within the electronic form and/or information about whether a field requires input from the end-user, which may be utilized for subsequent error checking of the electronic form. Electronic form generation program 160 determines fields to display within the electronic form by parsing the URL for one or more parameters. Furthermore, if electronic form generation program 160 determines that the URL does not contain one or more parameters that define a field with a missing value (decision 205, "no" branch), then the request is submitted to a location specified within the URL (e.g., server computer 105) and electronic form generation program 160 ends (step 210). However, if electronic form generation program 160 determines that the URL contains one or more parameters that define a field with a missing value and that need an input value from the end-user to populate the one or more parameters (decision 205, "yes" branch), then electronic form generation program 160 generates the electronic form having at least one field by utilizing the one or more parameters and any validation information (e.g., input type for the field) obtained from the parsing of the URL (step 215). Electronic form generation program 160 determines whether the URL is for generating an electronic form by parsing the URL for parameters that define a field with a missing value.

Moreover, to generate the electronic form, electronic form generation program 160 creates a web page document having a form element. The form element is utilized to construct the electronic form. The form element includes a field for each of the one or more parameters within the URL that define a field with a missing value, and that need an input value from the end-user to populate the one or more parameters. As part of generating the electronic form, the electronic form generation program 160 assigns each field an input type and a name and initiates display of the electronic form to the end-user. A variety of input types can be assigned to each field, and those input types include integer, double, string, date, time, e-mail, telephone, text, checkbox, password, radio, or button. Electronic form generation program 160 determines the input type and the name assigned to each field based on the information about the electronic form that was obtained by parsing the URL. However, if the information about the electronic form does not indicate the input type to assign to each field, then the input type for that field will be set to a value of "text". For example, if the URL is "http://www.ibm.com/form?age=&address=&phone=" then the parameters missing values are "age", "address", and "phone". Thus, fields within the electronic form would be named "age", "address", and "phone". The input type for each of the fields would be set to a value of "text", because an input type was not indicated for any of the parameters.

In another example, if instead the URL was "http://www.ibm.com/form?age@int=&address=&phone=" then the parameters with missing values are still "age", "address", and "phone". Also the fields would still be named "age", "address", and "phone". Moreover, since input types for the fields corresponding to "address" and "phone" are not indicated in the URL, their input types would still be set to a value of "text". However, the field corresponding to "age" would be of input type integer, because the input type for "age" is set to a value of "int" within the URL. The electronic form generation program 160 is programmed to position each field (where an input value is needed from the end-user) within the electronic form in a predetermined manner. In one embodiment, the electronic form generation program 160 is configured to position each field within the electronic form in an order that corresponds to the order that the parameters with missing values appear in the URL in which the first field having a name appears beneath the URL, and any subsequent field that is created is positioned beneath the immediate preceding field. Thus, if a second field is created, then the second field is positioned beneath the first field. However, in other embodiments the fields may be positioned within the electronic form in any suitable order determined by a programmer configuring electronic form generation program 160, for example the fields may be positioned in a random order or alphabetically within the electronic form. After generating the electronic form, electronic form generation program 160 displays the electronic form to the end-user so that the end-user can enter an input value into each field within the electronic form.

As the end-user enters an input value into each field, electronic form generation program 160 receives the input value from the end-user via the electronic form (step 220). Subsequently, electronic form generation program 160 validates that each field within the electronic form has been populated with an input value from the end-user (step 225). If after the validation electronic form generation program 160 determines that each field, within the electronic form, that needs an input value from the end-user has not been populated with an input value, then electronic form generation program 160 will not allow the electronic form to be submitted until the end-user has entered a value into each field. Moreover, if within the URL other validation information is included such as a specific input type for a field within the electronic form, then electronic form generation program 160 can validate that the input value entered by the end-user into that field is of the specific input type. In the present embodiment an electronic form is generated to obtain an input value from the end-user to populate one or more parameters of the URL. However, in an alternative embodiment the electronic form may not be generated, but instead program code such JAVASCRIPT may be utilized to prompt the end-user for an input value to populate one or more parameters of the URL.

Furthermore, electronic form generation program 160 updates the URL with each input value that the end-user entered into each field. Specifically, each of the one or more parameters, which define a field with a missing value and that need an input value from the end-user, is updated with an input value that the end-user entered into the field. After the end-user has entered an input value into each field within the electronic form, electronic form generation program 160 determines whether the end-user wants to submit or cancel the electronic form (step 230). If electronic form generation program 160 determines that the end-user wants to cancel the electronic form (decision 235, "yes" branch), then the electronic form will be aborted and electronic form generation program 160 will end. However, if the electronic form generation program 160 determines that the end-user wants to submit the electronic form (decision 235, "no" branch), then electronic form generation program 160 submits the electronic form to a destination (step 240). The destination is defined based on an action attribute within the form element, wherein the action attribute may be obtained from the URL. Moreover, the action attribute may be a server-side document (e.g., PHP, JAVA servlet, JSP page, or HTML file) that can handle submission of the input value entered by the end-user into each field within the electronic form. In the present embodiment, the destination is a server computer 105. If client computer 135 does not have network connectivity, then the electronic form will be stored on a suitable computer-readable tangible storage device connected to client computer 135. Thus, if client computer 135 eventually obtains network connectivity, then the electronic form can be retrieved from the suitable computer-readable tangible storage device and submitted to server computer 105.

Figure 3:
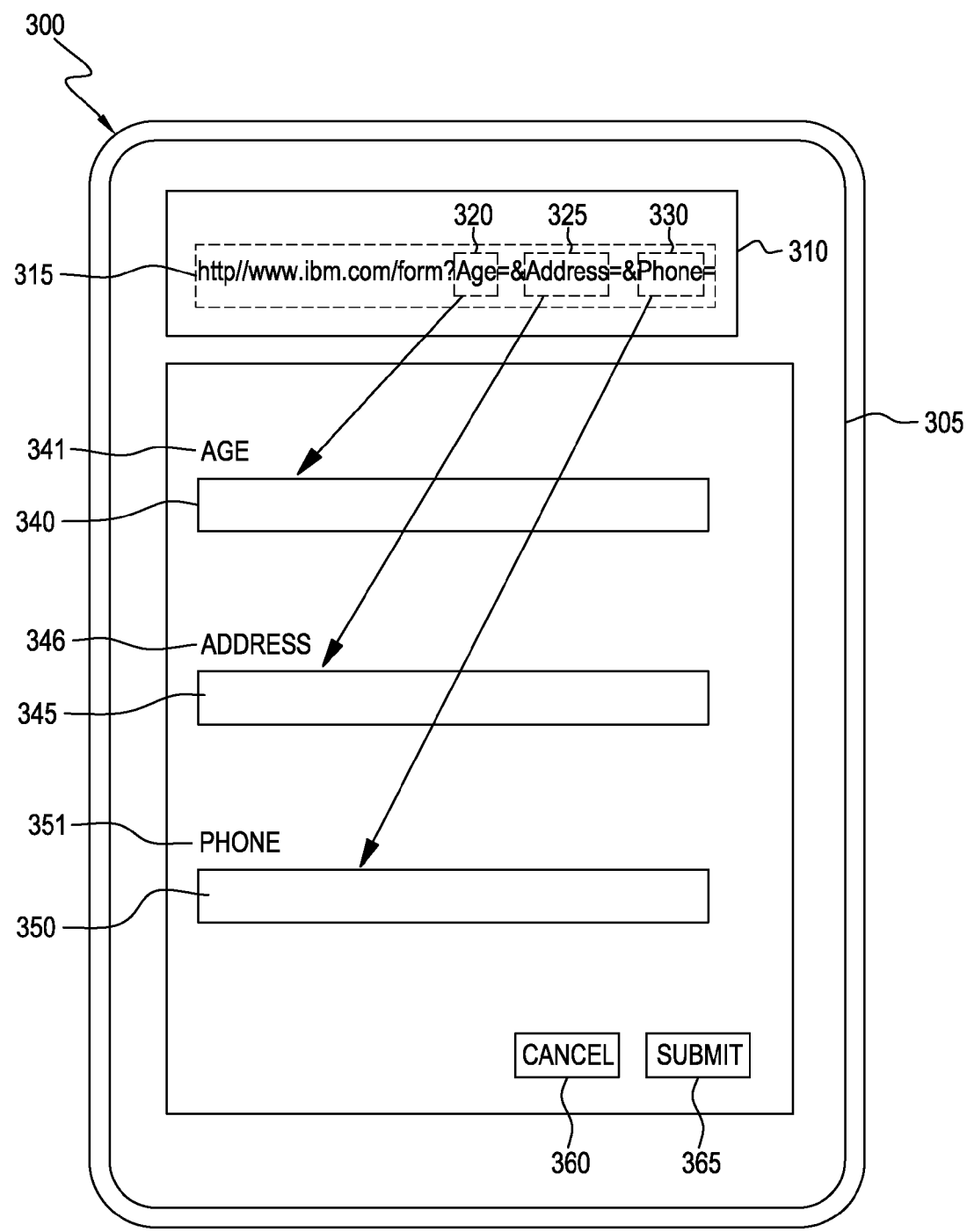
FIG. 3 is a pictorial representation illustrating an electronic form generated by the electronic form generation program of FIG. 1 and rendered on a display connected to the client computer of FIG. 1 according to an embodiment of the present invention.

FIG. 3 illustrates one embodiment in which electronic form 305 is rendered on a display 300 connected to client computer 135. In one embodiment, display 300 may include a URL field 310 where URL 315, which an end-user selected, is made viewable to the end-user. URL 315 includes parameter 320, parameter 325, and parameter 330 each with missing values. In addition, electronic form 305 includes fields 340, 345, and 350 each having respective names 341, 346, and 351. Thus, the names for each of the fields are derived from parameters 320, 325, and 330. Electronic form 305 also includes cancel button 360, which is a field that allows the end-user to cancel electronic form 305 without submitting electronic form 305 to server computer 105. In addition, in one embodiment, electronic form 305 includes submit button 365, which allows the end-user to submit electronic form 305 to server computer 105 after the end-user has entered in an input value into fields 340, 345, and 350. However, if client computer 135 does not have network connectivity, then electronic form 305 will be stored on a suitable computer-readable tangible storage device connected to client computer 135. If client computer 135 subsequently obtains network connectivity, then electronic form 305 can be submitted to server computer 105 for application program 110 to utilize. In an alternative embodiment, electronic form 305 may not have a submit button 365, but may be submitted utilizing a script.

Figure 4:
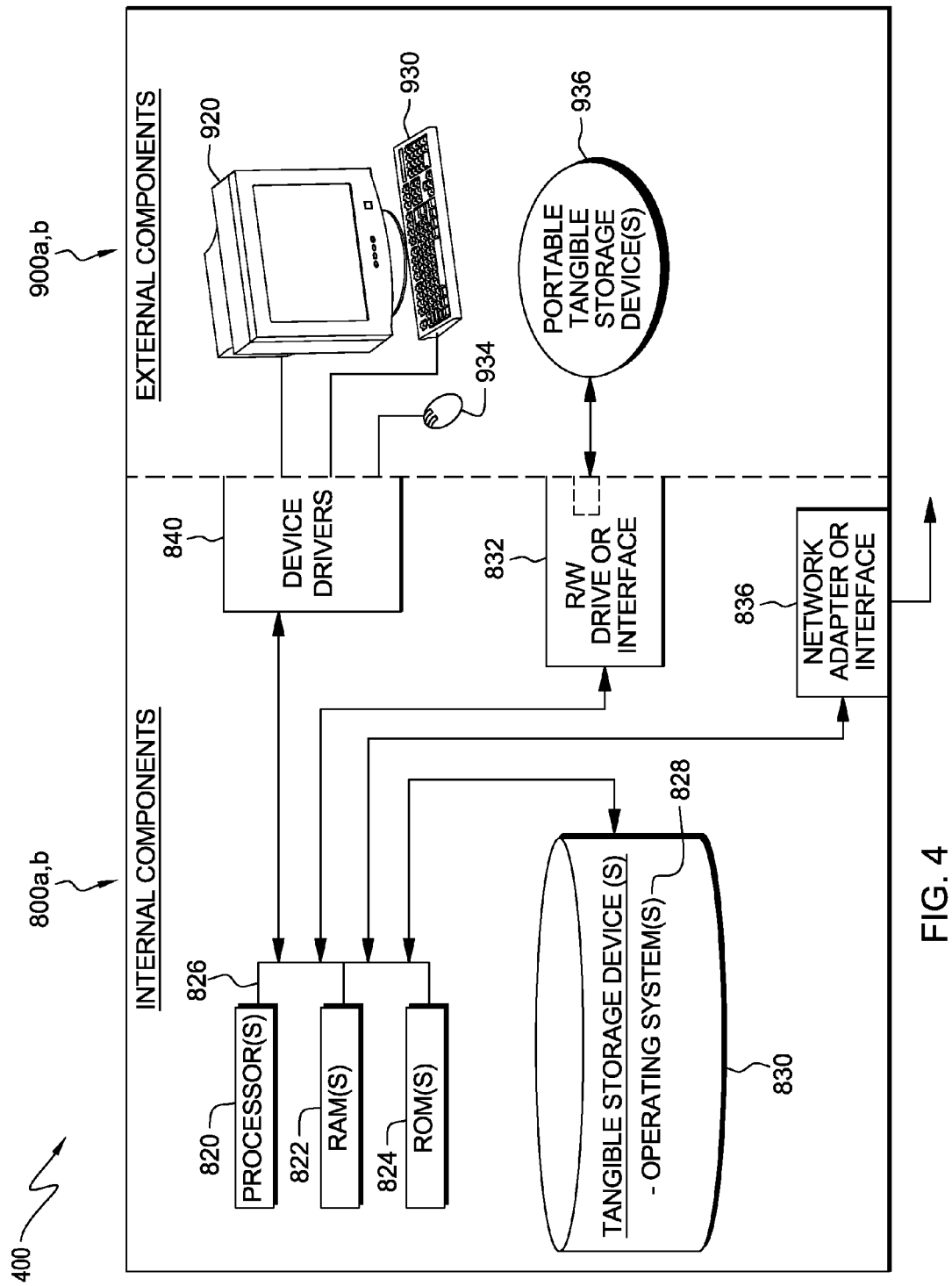
FIG. 4 is a block diagram depicting internal and external components of the server computer and the client computer of FIG. 1 according to an embodiment of the present invention.

FIG. 4 is a block diagram depicting a set of internal components 800a and a set of external components 900a that correspond to server computer 105, as well as a set of internal components 800b and a set of external components 900b that correspond to client computer 135. Internal components 800a and 800b each include one or more processors 820, one or more computer-readable RAMs 822, one or more computer-readable ROMs 824 on one or more buses 826, and one or more operating systems 828 and one or more computer-readable tangible storage devices 830. The one or more operating systems 828 and application program 110 in server computer 105; and programs 140, 145, 150, 155, and 160 in client computer 135 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a and 800b includes a R/W drive or interface 832 to read from and write to one or more portable computer-readable tangible storage devices 936 such as CD-ROM, DVD, memory stick, magnetic tape, magnetic disk, optical disk or semiconductor storage device. Application program 110 in server computer 105; and programs 140, 145, 150, 155, and 160 in client computer 135 can be stored on one or more of the respective portable computer-readable tangible storage devices 936, read via the respective R/W drive or interface 832 and loaded into the respective hard drive 830.

Furthermore, each set of internal components 800a and 800b also includes a network adapter or interface 836 such as TCP/IP adapter card, wireless wi-fi interface card, or 3G or 4G wireless interface card or other wired or wireless communication link. Application program 110 in server computer 105; and programs 140, 145, 150, 155, and 160 in client computer 135 can be downloaded to respective computers 105 and 135 from an external computer or external storage device via a network (for example, the Internet, a LAN, or a WAN) and respective network adapters or interfaces 836. From the network adapter or interface 836, the application program 110 in server computer 105; and programs 140, 145, 150, 155, and 160 in client computer 135 are loaded into respective hard drive 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer-readable tangible storage device 830 and/or ROM 824.

It should be appreciated that FIG. 4 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Computer program code for carrying out operations for aspects of an embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the end-user's computer, partly on the end-user's computer, as a stand-alone software package, partly on the end-user's computer and partly on a remote computer, or entirely on a remote computer or server. In the latter scenario, the remote computer may be connected to the end-user's computer through any type of network, including a LAN or WAN, or the connection may be made to an external computer (for example, through the Internet using an Internet Service Provider). Alternatively, the functions of the aforementioned programs can be implemented in whole or in part by computer circuits and other hardware (not shown).

Based on the foregoing, a method, computer system, and computer program product have been disclosed for generating an electronic form from uniform resource locator (URL) parameters that define a field with a missing value, and that need entry of an input value from the end-user. However, numerous modifications substitutions can be made without deviating from the scope of an embodiment of the invention. Therefore, one or more embodiments of the invention have been disclosed by way of example and not limitation.

What is claimed is:

1. A method for generating an electronic form, the method comprising the steps of:
   a computer displaying a screen that includes a link to a uniform resource locator (URL);
   in response to a selection of the link by an end-user, the computer intercepting a corresponding request for the URL to prevent the request from being sent to another computer;
   the computer determining whether the URL corresponds to an electronic form and includes one or more parameters that define a field with a missing value;
   the computer generating an electronic form utilizing the one or more parameters to formulate a field, within the electronic form, for each of the one or more parameters; and
   the computer displaying the electronic form including the field for each of the one or more parameters, which enables the end-user to enter information into the field within the electronic form.

2. The method of claim 1, wherein:
   the URL is a selectable link or object that is clickable and/or capable of being scanned;
   the URL includes validation information;
   the validation information comprises an input type for the field; and
   the input type for the field includes integer, double, string, date, time, e-mail, telephone, text, checkbox, password, radio, or button.

3. The method of claim 1, wherein:
   the URL includes validation information;
   the validation information includes information about whether the field requires input from the end-user, but is missing an input type for the field; and
   the computer sets the input type for the field to a value of "text".

4. The method of claim 1, wherein:
   the URL is missing validation information; and
   the computer sets an input type for the field to a value of "text".

5. The method of claim 1, wherein the step of the computer intercepting the request further comprises:
   retrieving the URL from the request;
   parsing the URL to obtain information about the electronic form, wherein the information about the electronic form comprises either a name for the field or an input type and a name for the field; and
   utilizing the information to identify the one or more parameters.

6. The method of claim 1, wherein the step of the computer generating the electronic form further comprises:
   generating a web page document having a form element, that is utilized to construct the electronic form, and the form element includes the field for each of the one or more parameters; and
   assigning the field an input type and a name.

7. The method of claim 6, wherein:
   the form element includes an action attribute; and
   the action attribute is obtained from the URL.

8. The method of claim 1, wherein the electronic form includes a field for the end-user to submit the electronic form to a destination, and a field for the end-user to cancel the electronic form.

* * * * *